(12) United States Patent
Mishra et al.

(10) Patent No.: US 8,311,287 B2
(45) Date of Patent: Nov. 13, 2012

(54) VALIDATION AND CORRECTION OF MAP DATA USING OBLIQUE IMAGES

(75) Inventors: Pragyana K. Mishra, Kirkland, WA (US); Eyal Ofek, Redmond, WA (US); Gur Kimchi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1084 days.

(21) Appl. No.: 12/237,817

(22) Filed: Sep. 25, 2008

(65) Prior Publication Data

US 2010/0074538 A1 Mar. 25, 2010

(51) Int. Cl.
*G06K 9/00* (2006.01)
(52) U.S. Cl. .................... 382/113; 380/154
(58) Field of Classification Search .............. None
See application file for complete search history.

(56) References Cited

U.S. PATENT DOCUMENTS

| | | | |
|---|---|---|---|
| 6,259,452 B1 | 7/2001 | Coorg et al. | |
| 6,597,818 B2 | 7/2003 | Kumar et al. | |
| 7,286,708 B2 | 10/2007 | Arcas | |
| 7,295,203 B2 | 11/2007 | Vincent | |
| 7,397,972 B2 | 7/2008 | Shimizu et al. | |
| 7,630,797 B2 * | 12/2009 | Garceau et al. | 701/3 |
| 2007/0237420 A1 | 10/2007 | Steedly et al. | |
| 2008/0123994 A1 | 5/2008 | Schultz et al. | |
| 2011/0264362 A1 * | 10/2011 | Van Raamsdonk et al. | 701/200 |

OTHER PUBLICATIONS

Pantofaru et al., Toward Generating Labeled Maps from Color and Range Data for Robot Navigation; IEEE, Oct. 2003, pp. 1314-1321.*
Kawai et al., Automatic Registration of Aerial Oblique Images and a Digital Map, SICE Annual Conference, 2007, pp. 1791-1794.*
Frueh et al., Automated Texture Mapping of 3D City Models with Oblique Aerial Imagery, IEEE Computer Society, Aug. 2004, 8 pages.*
Mishra et al., Validation of Vector Data using Oblique Images, ACM GIS '08, Dec. 5, 2008, 10 pages.*
Jana Niederoest, "A Bird's Eye View on Switzerland in the 18th Century: 3d Recording and Analysis of a Historical Relief Model", Zurich: Swiss Federal Institute of Technology Zurich, ETH-Hönggerberg, Institute of Geodesy and Photogrammetry, May, 2004, 6 pages.
Chen, et al., "Error Modelling on Registration of High Resolution Satellite Images and Vector Data", International Archives of Photogrammetry, Remote Sensing and Spatial Informatoion Sciences , ISPRS, 35(B1), Istanbul, 2004, 6 pages.
Agouris, et al., "Automated spatiotemporal change detection in digital aerial imagery", SPIE Proceedings vol. 4054, Aerosense 2000, Orlando, 11 pages.

(Continued)

*Primary Examiner* — Brian P Werner
(74) *Attorney, Agent, or Firm* — Hope Baldauff Hartman, LLC (57) ABSTRACT

Technologies are described herein for validating and correcting map data using oblique images or aerial photographs taken at oblique angles to the earth's surface. Pixels within oblique images can be analyzed to detect, validate, and correct other sources of data used in generating maps such as vector data, elevation maps, projection parameters, and three-dimensional model data. Visibility and occlusion information in oblique views may be analyzed to reduce errors in either occluding or occluded entities. Occlusion of road segments due to foliage, z-ordering of freeways, tunnels, bridges, buildings, and other geospatial entities may be determined, validated, and corrected. A learning algorithm can be trained with image-based descriptors that encode visible data consistencies. After training, the algorithm can classify errors and inconsistencies using combinations of different descriptors such as color, texture, image-gradients, and filter responses.

20 Claims, 9 Drawing Sheets

OTHER PUBLICATIONS

Schultz, et al., "Error Detection and DEM Fusion Using Self-Consistency", Proceedings of the International Conference on Computer Vision, vol. 2, 1999, 8 pages.

Stricker, et al., "Similarity of Color Images", SPIE'95, San Jose, 1995, 12 pages.

Ma, et al., "Benchmarking of Image Features for Content-based Retrieval", Conference Record of the Thirty-Second Asilomar Conference on Signals, Systems & Computers, 1998. vol. 1, Issue, Nov. 1-4, 1998, pp. 253-257.

Freeman, et al., "The design and Use of Steerable Filters", IEEE Transactions on Pattern Analysis and Machine Intelligence, vol. 13, No. 9, Sep. 1991, pp. 891-906.

Alan Saalfeld, "Conflation: Automated Map Compilation", International Journal of Geographical Information Systems, 1988, pp. 217-228.

Chen, et al., "Automatically Annotating and Integrating Spatial Datasets", In Proceedings of the International Symposium on Spatial and Temporal Databases, Santorini Island, 2003, 18 pages.

Hild, et al., "Integration of Vector Data and Satellite Imagery for Geocoding", IAPRS, vol. 32, Part 4 "GIS-Between Visions and Applications", Stuttgart, 1998, pp. 246-251.

Keith Price, "Road Grid Extraction and Verification", IAPRS, 1999, pp. 1-7.

* cited by examiner

VALIDATION AND CORRECTION OF MAP DATA USING OBLIQUE IMAGES

BACKGROUND

Map generation can incorporate information from several sources. Some examples include vector data, projection parameters, digital elevation maps, and three-dimensional models. Errors or inaccuracies in each of the data sources can impact the overall accuracy and quality of a map. Automatically detecting such errors can be complicated when there is little, or no, ground truth available against which the data can be compared for validation. However, images or photographs capturing geospatial attributes of a scene may be used as ground truth for validating and correcting map data.

Most aerial images or satellite imagery provide top-down orthographic views of a scene. Such images can be used for comparison and validation of map data. However, the attributes of data that can be validated using aerial images may be limited because the projection is orthographic in nature and three-dimensional attributes of the scene are not entirely captured in top-down orthographic views. For example, inaccuracies in altitude, building heights, and occluding structure positioning cannot be identified using orthographic aerial imagery.

It is with respect to these considerations and others that the disclosure made herein is presented.

SUMMARY

Technologies are described herein for validating and correcting map data using oblique images. In particular, techniques for detecting inaccuracies in map data can use oblique angle camera views of a scene. Such views can support registration of altitude-dependent features within the scene.

Aerial photographs taken at oblique angles to the earth's surface can be referred to as oblique images or as bird's images. Such images can have a wide field of view to cover a large expanse of a scene. The images can capture the three-dimensional nature of the earth's surface and structures such as buildings and highways. Pixels of oblique images can be analyzed to detect, validate, and correct other sources of data used in generating maps. For example, errors due to inaccurate and imprecise vectors, elevation maps, projection parameters, and three-dimensional model data may be detected and corrected using pixel statistics from oblique images. A learning algorithm can be trained with image-based descriptors that encode visible data consistencies. After training, the algorithm can classify errors and inconsistencies using combinations of different descriptors such as color, texture, image-gradients, and filter responses.

According to one aspect presented herein, oblique images may be used to validate, detect, and correct errors in vector data, digital elevation maps, three-dimensional model data and other geospatial data. Pixel statistics of oblique images may be used to determine consistency of non-imagery data overlaid on oblique images.

According to another aspect presented herein, visibility and occlusion information in oblique views may be analyzed to reduce errors in either occluding or occluded entities. Occlusion of road segments due to foliage, z-ordering of freeways, tunnels, bridges, buildings, and other geospatial entities may be determined.

According to yet another aspect presented herein, geospatial outliers may be determined using learning algorithms, pixel statistics, and kernel classifiers. Learning algorithms can classify errors and inconsistencies using descriptors such as color, texture, image-gradients, and filter responses.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for validating and correcting map data using oblique images. Through the use of the technologies and concepts presented herein, a learning algorithm can be trained with image-based descriptors that encode visible data consistencies. After training, the classifier can detect errors and inconsistencies using combinations of different descriptor information such as color, texture, image-gradients, and filter responses.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for validating and correcting map data using oblique images are described.

Figure 1:
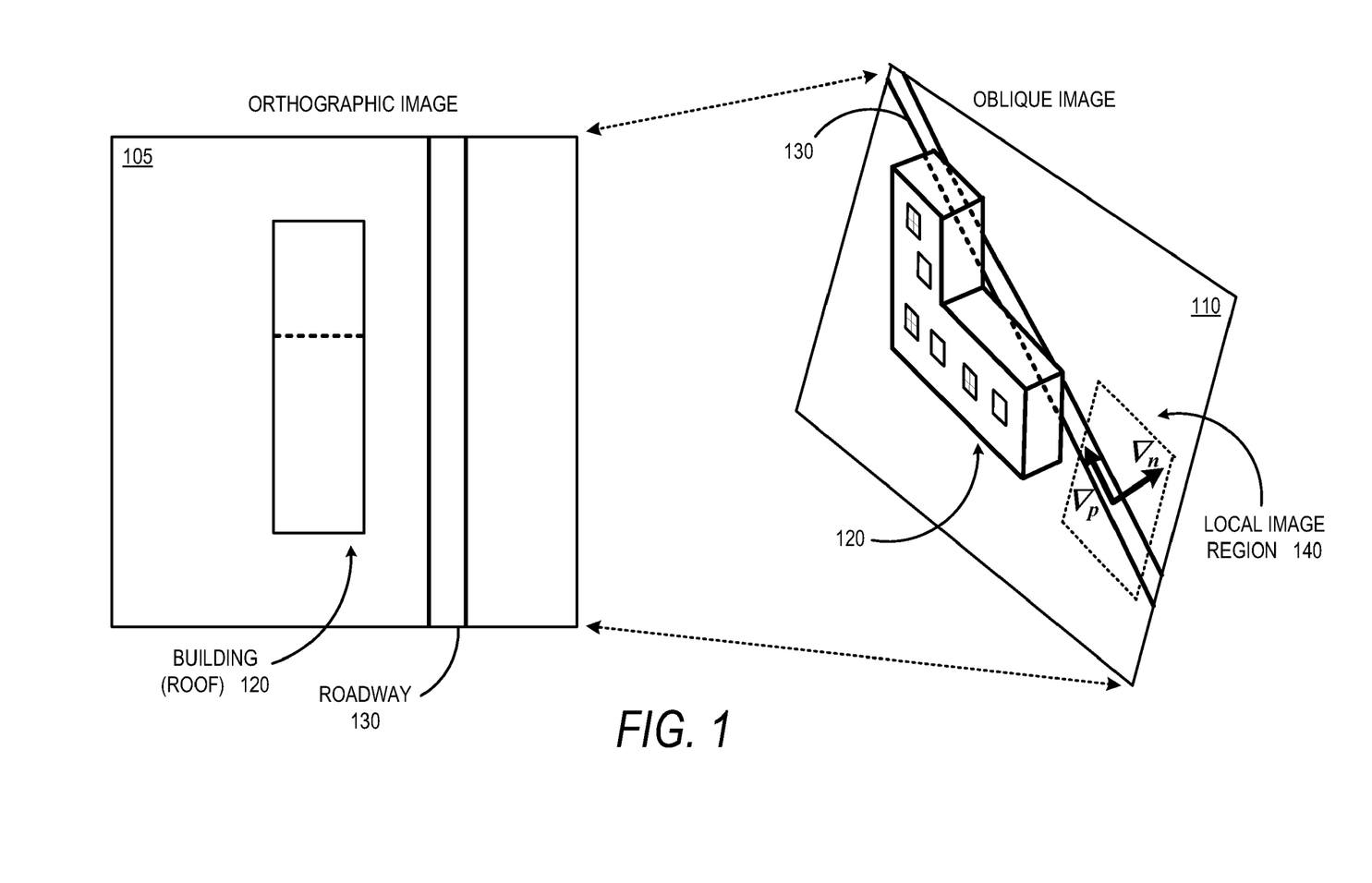
FIG. 1 is an imaging diagram illustrating orthographic and oblique views of a geographic scene according to aspects of an embodiment presented herein.

Turning now to FIG. 1, an imaging diagram illustrates orthographic and oblique views of a geographic scene according to aspects of an embodiment presented herein. An orthographic image 105, or aerial image, such as that from a satellite can provide a top-down view of a scene. However, inaccuracies in altitude, building heights, and occluding structure positioning may not be identified using an orthographic image 105. For example, extracting information regarding the height of a building 120 next to a roadway 130 may not be possible from an orthographic image 105.

An oblique image 110, of substantially the same scene as the orthographic image 105, can expose the view-dependency of the three-dimensional world. Occluding and occluded parts of the world, such as the roadway 130 behind the building 120, may be viewed in the oblique image 110 depending on the position and orientation that the image was taken. Image pixel regions that correspond to occluding and occluded objects can be used to derive consistency of the objects as they appear in the image. The consistency can be further used to rectify any inaccuracies in data used for segmenting and labeling of the objects.

As one example, straight roads that are on the slope of a hill may appear curved in an oblique image 110. The mapping between a three-dimensional point of the world and its corresponding point on the image may be expressed as a non-linear function that depends on the elevation of the three-dimensional point in space. Additionally, visibility of the three-dimensional point can depend on the camera position and the structure of the world around that three-dimensional point. The point may not be visible in the oblique image 110 if it is occluded by a physical structure in the line-of-view of the camera. These properties may be used to detect and rectify errors in the position of the three-dimensional point as well as any inconsistencies of structures in the neighborhood of the point.

Analysis of an oblique image 110 may be performed using descriptors. It should be appreciated that while techniques are described herein as using information from an oblique image 110, that two or more oblique images 110 may be used separately, or in combination, without departing from the spirit or scope addressed herein.

Descriptors may be calculated over a local image region 140 where a plurality of local image regions 140 can subdivide an oblique image 110. Each local image region 140 may be evaluated in terms of a primary direction lying along a related vector structure, such as a roadway 130. Similarly, a normal direction may be defined as normal to, or perpendicular to, the primary direction. Gradient vectors may be calculated along these primary and normal directions as illustrated in FIG. 1 and discussed in additional detail with respect to FIG. 6.

Figure 2:
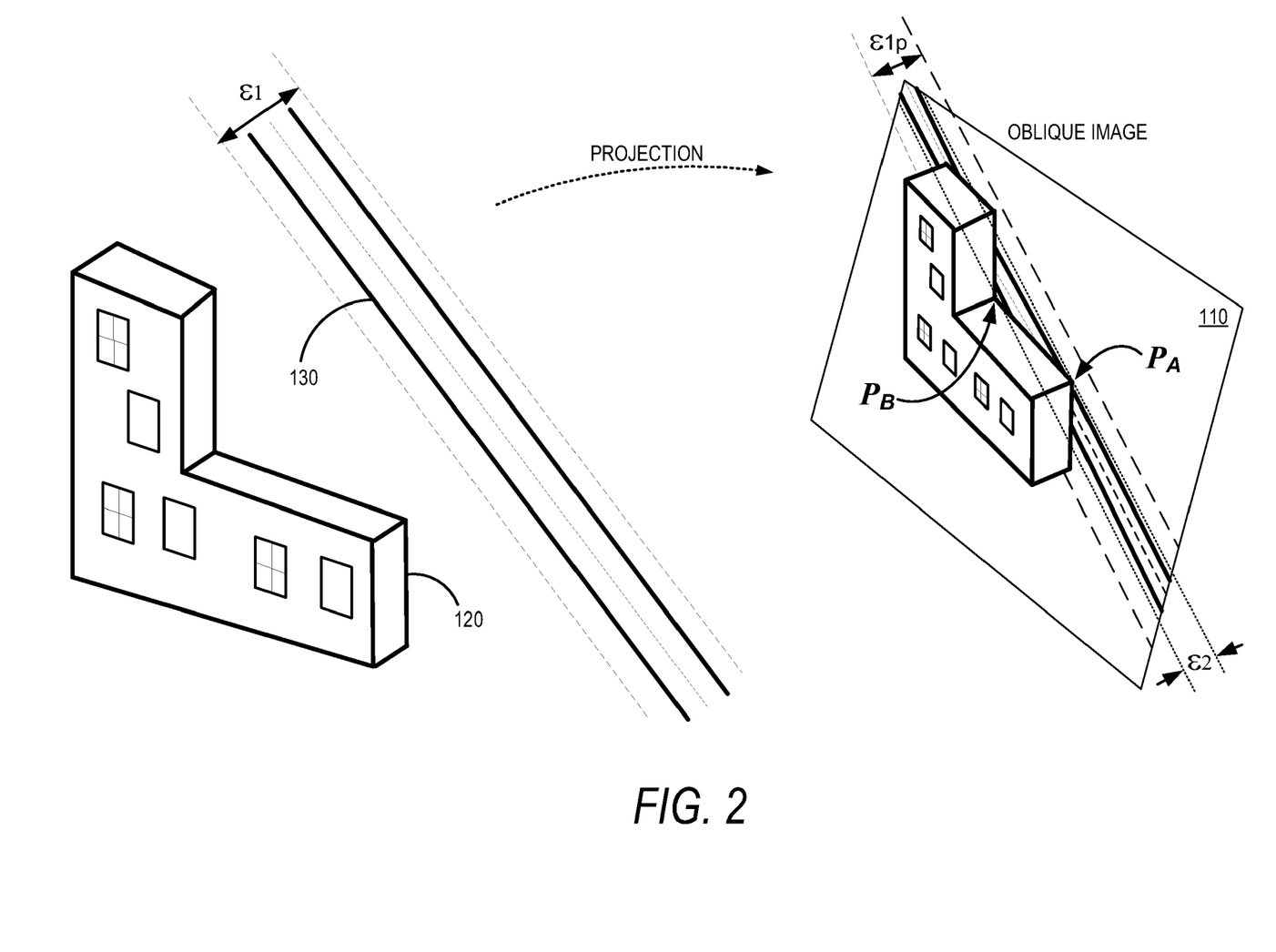
FIG. 2 is an image projection diagram illustrating error bound correction using oblique image features according to aspects of an embodiment presented herein.

Referring now to FIG. 2, an image projection diagram illustrates error bound correction using oblique image features according to aspects of an embodiment presented herein. A map image may be generated by combining various information sources. Information from these sources may be overlaid onto a photograph of the area being mapped. For example, structure data defining a building 120 and vector data defining the location of a roadway 130 may be overlaid onto an image containing the actual building and roadway.

Overlaying vector indicators of a roadway 130 onto a photograph may be performed using colored lines, or dotted lines, for the roadway 130 and labels indicating the name of the roadway. Positioning of the overlay may show inaccuracies due to uncertainty in the supplied vector data for the roadway 130. An oblique image 110 can be used to validate, remove, or reduce this type of uncertainty encountered when generating map images.

An oblique image 110 can capture the view-dependency and three-dimensional nature of geospatial data. This characteristic of an oblique image 110 can be leverage for validation and correction of disparate data sources. A projection of the three-dimensional world can account for altitude (terrain), structure models, and the arrangement of geospatial entities with respect to one another. For example, vector information for a roadway 130 may have an uncertainty in its position denoted as $\epsilon 1$. Error bounds, illustrated as dotted lines parallel to the roadway 130 may be related to the limits of the positional uncertainty.

Vector data for the roadway 130 may be projected into the viewing angle of an oblique image 110. The error bounds may be projected through the same transformation as the roadway 130 to provide an oblique projection of the positional uncertainty given as $\epsilon 1p$. Such a projection can be a non-linear (perspective) project and take into account the altitude in addition to latitude and longitude of points along the roadway 130.

In the oblique view 110, the roadway 130 may be occluded by another geospatial entity. For example, the building 120 partially occludes the roadway 130 as illustrated. The fact that the road is being occluded by the building can be used to reduce the error bounds of the road. This may be done after image-pixel statistics within the oblique image 110 are used to determine the interdependency between the two geospatial entities. The projected error bounds can be reduced to a narrower set of dotted lines at points $P_A$ and $P_B$. As such, the projected positional uncertainty of the vector representing the roadway can be reduced to $\epsilon 2$ from $\epsilon 1p$. This is one example of leveraging the view-dependency of three-dimensional geospatial entities in oblique images to detect and correct inconsistencies in map data.

Figure 3:
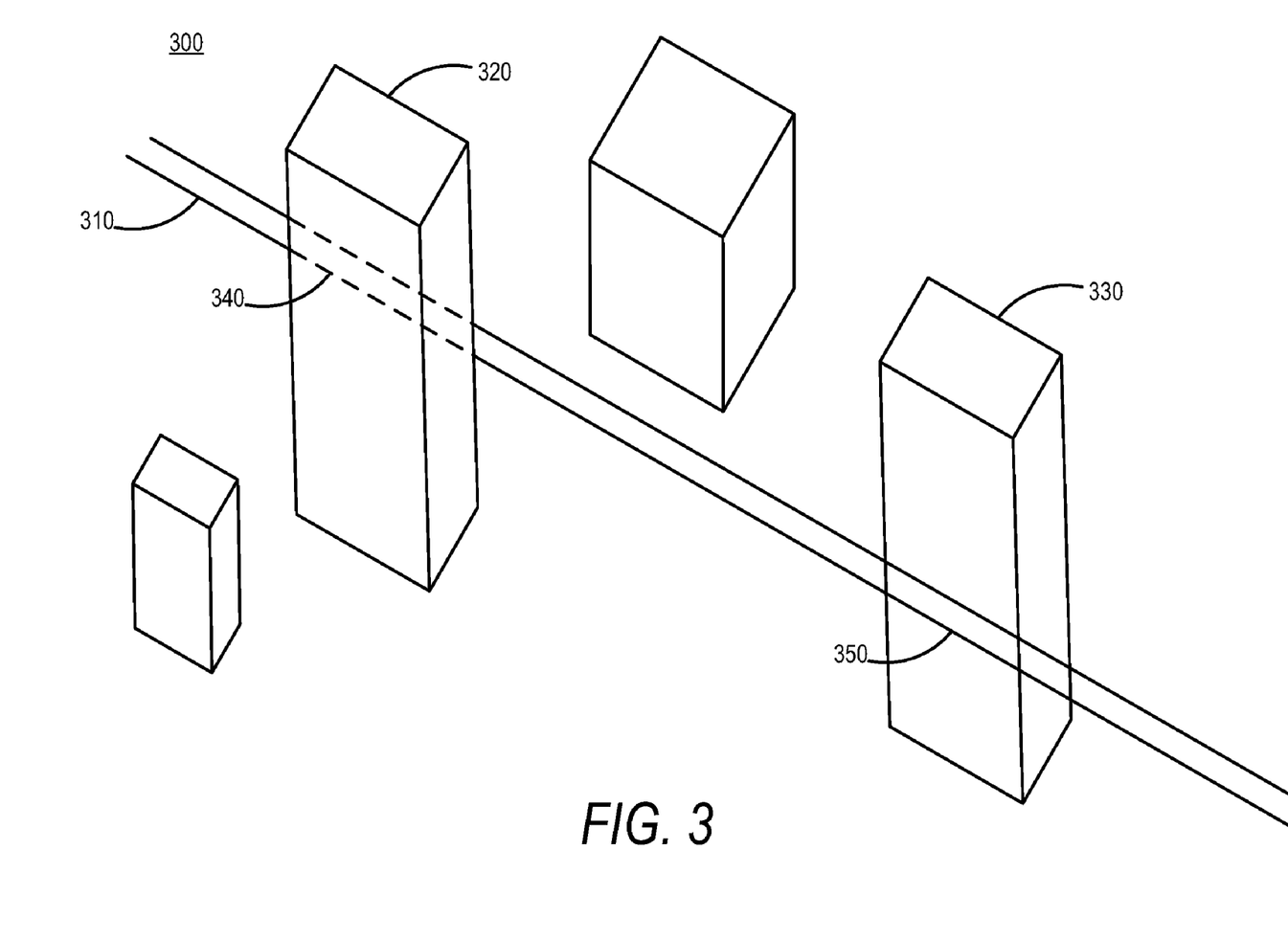
FIG. 3 is a map image illustrating the detection and correction of missing structure model data according to aspects of an embodiment presented herein.

Turning now to FIG. 3, a map image 300 illustrates the detection and correction of missing structure model data according to aspects of an embodiment presented herein. When vector information for a roadway 310 is overlaid onto an image during map generation, interactions between the roadway 310 and other elements may be indicated in the image. For example, the other elements may be structures, buildings, bridges, foliage, other roadways, tunnels, signage, and so on. As illustrated, a first building 320 occludes a portion of a roadway 310 in the first occluded region 340. When the information for the roadway 310 is overlaid onto the image 300, the first occluded region 340 can be indicated.

For example, the occluded region can be dotted to indicate that while not visible, there is a continuous roadway 310 behind the occluding structure of the first building 320.

As illustrated, a second building 330 may occlude a second occluded region 350. However, the structural information provided for the second building 330 may have been missing or incorrect. Thus, the second occluded region 350 may not be properly marked as occluded. The second occluded region 350 may appear as incorrectly painted over the second building 330. Such an inconsistency within a map image may be detected and corrected using descriptor classifier techniques discussed herein.

Figure 4:
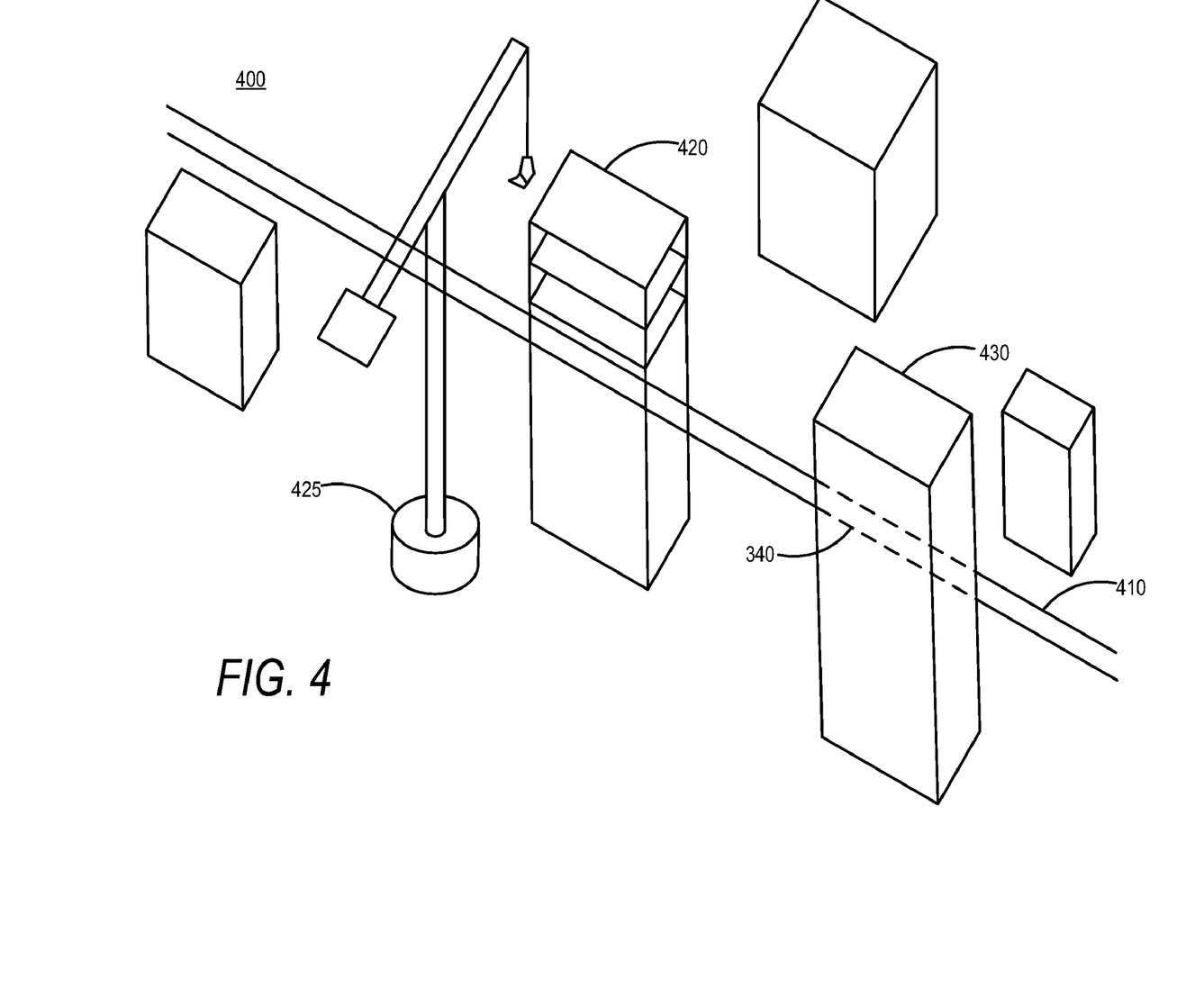
FIG. 4 is a map image illustrating the detection and correction of out-of-date structure model data according to aspects of an embodiment presented herein.

Referring now to FIG. 4, a map image 400 illustrates the detection and correction of out-of-date structure model data according to aspects of an embodiment presented herein. A first building 430 can occlude a portion of a roadway 410 in a first occluded region 340. When the information for the roadway 410 is overlaid onto an image 400, the first occluded region 340 can be indicated. For example, the occluded region can be dotted to indicate that while not visible, there is a continuous roadway 410 behind the occluding structure of the first building 430.

As illustrated, a second building 420 may be currently under construction having incomplete upper floors and a construction crane 425 on site. During its recent construction, the second building 420 has risen to occlude the roadway 410. However, the structural information provided for generating the map image 400 did not yet include the new second building 420. Thus, the portion of the roadway 410 occluded by the new second building 420 may not be properly marked as occluded. The roadway 410 may incorrectly appear as painted over the new second building 420. Such an inconsistency within a map image may be detected and corrected using descriptor classifier techniques discussed herein.

Figure 5:
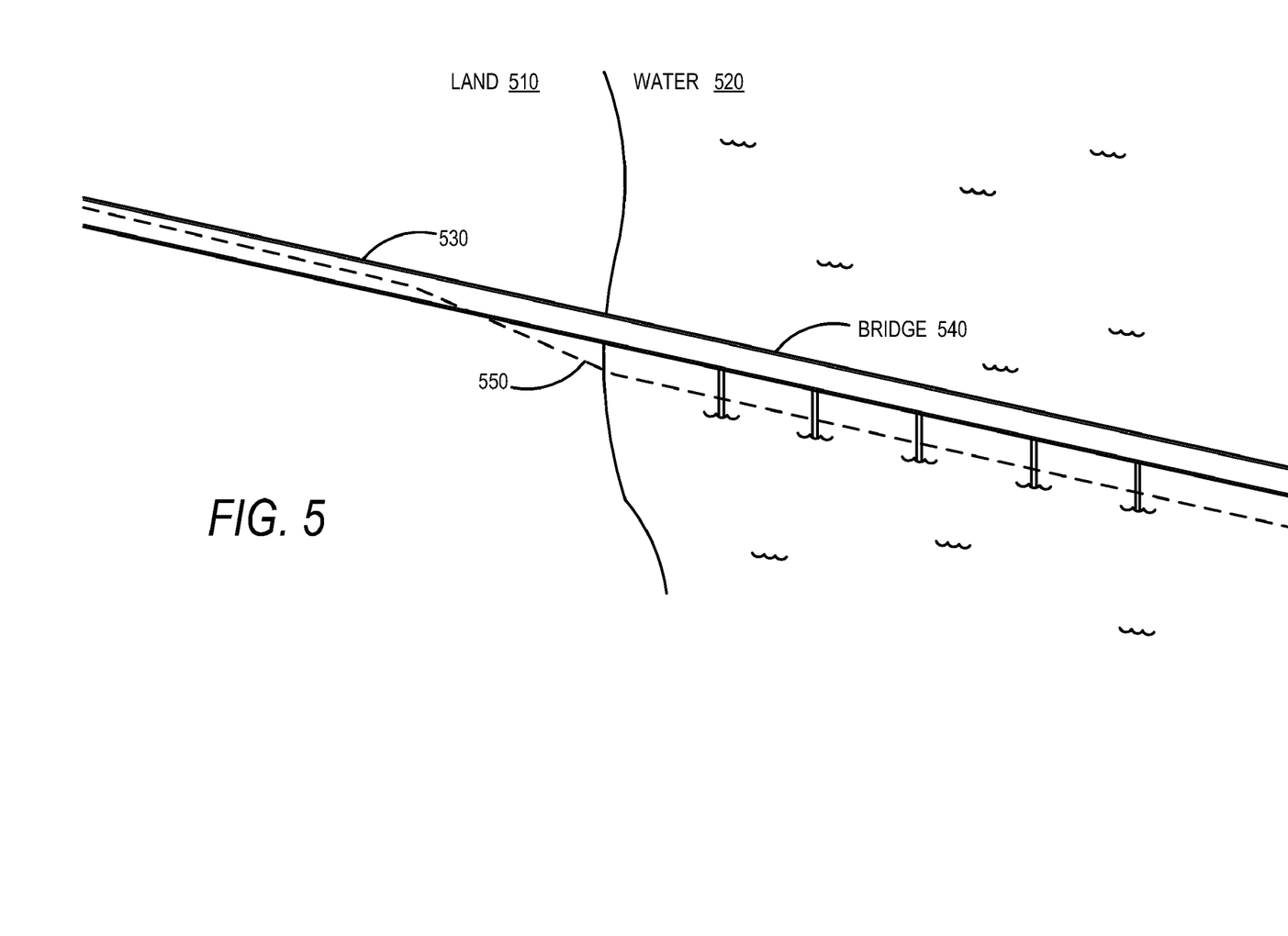
FIG. 5 is a map image illustrating the detection and correction of incorrect elevation data according to aspects of an embodiment presented herein.

Referring now to FIG. 5, a map image illustrates the detection and correction of inconsistent elevation data according to aspects of an embodiment presented herein. A roadway 530 can extend from a region of land 510 to a region of water 520 as supported by a bridge 540. Vector information for the roadway 530 may be overlaid onto the image. This overlay may appear, for example as a colored line or as dotted line 550. However, the digital elevation map (DEM), or other elevation data, provided for generating the map image may specify the roadway surface along the land 510 and water 520 without accounting for the addition elevation of the bridge 540. Thus, the roadway dotted line 550 may incorrectly appear as painted over the water 520 and not over the bridge 540. Such an inconsistency within a map image may be detected and corrected using descriptor classifier techniques discussed herein.

Similar elevation information can con into play when correcting the z-order of freeways exchanges, bridges, tunnels, and other structures where roadways overlaid in maps are occluded, or elevation-altered by structures. Oblique images can reveal these effects and descriptor classifiers may be used to identify and correct the related inconsistencies in generated map images.

Figure 6:
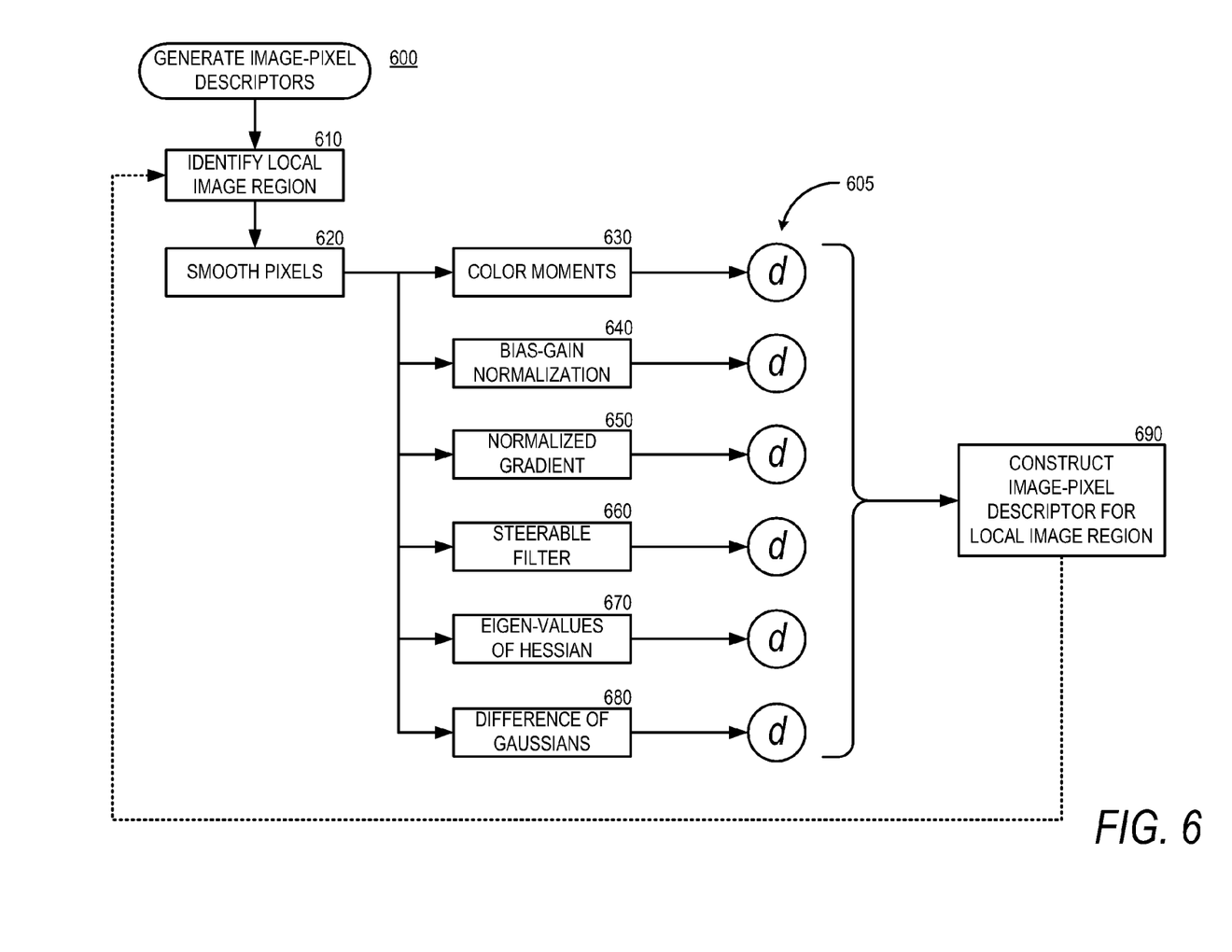
FIG. 6 is a flow diagram illustrating a process for generating image-pixel descriptors according to aspects of an embodiment presented herein.

Referring now to FIG. 6, additional details will be provided regarding the embodiments presented herein for validating and correcting map data using oblique images. In particular, FIG. 6 is a flow diagram illustrating aspects of a process 600 for generating image-pixel descriptors according to aspects of an embodiment presented herein. To understand and learn three-dimensional geospatial entity dependencies from oblique images 110, image-pixel statistics may first be computed using a set of descriptors. A classifier can then be trained to learn the descriptors and classify points within an image as consistent or inconsistent with descriptors learned. Process 600 addresses the generation of the descriptors used in such techniques.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

The routine 600 begins at operation 610, where a local image region 140 is identified for analysis. In operation 620, image data can be pre-processed by smoothing image pixels. For example, a Gaussian kernel or Gaussian blur may be applied to the image. The kernel may be applied using convolution of the kernel against the image. The Gaussian kernel may be defined by its standard deviation $\sigma_s$. For example, a standard deviation of $\sigma_s=2.8$ pixels may be used.

Operation 630 can generate an image-pixel descriptor for color moments. The color of a local image region 140 may be represented by local histograms of photometric invariants. This can be derived from the pixel values in CIELUV color space. The three central moments (median, standard deviation, and skewness) for each color component may be computed from the pixel values in the region. These color moments can then be concatenated into a nine-dimensional color vector. Each dimension of this vector can be normalized to unit variance so that the luminance component does not dominate the distance metric.

The CIELUV color space can have perceptual such that any pair of equidistant points in the color space has the same perceived color difference. Other color spaces such as RGB, HSV, CIE, and XYZ may not exhibit perceptual uniformity. Color moments for each component of the CIELUV color space can be used to generate a nine-dimensional color descriptor having three moments for each of the three color components. Color moments may be consistent and robust for encoding color of image patches. Using color moments to represent color distributions can provide a compact representation. Performance while using color moments can approach that of solutions using high-dimensional color histograms. Also, associated accuracy can be consistently improved over the accuracy of using cumulative color histograms. The techniques discussed herein may also be applied to images of any color dimension. For example, black and white images may be used. Also, multispectral images that have more than three bands may be used.

Operation 640 can generate an image-pixel descriptor for bias-gain normalization. A smoothed pixel region can be bias and gain normalized in each color channel. The bias-gain normalized color value can be computed by subtracting the mean and dividing by the standard deviation of the region.

Operation 650 can generate an image-pixel descriptor for a normalized gradient. The gradient vector of each bias-gain normalized region can be evaluated along a primary and normal direction: $\nabla_p$ and $\nabla_n$ as discussed with respect to FIG. 1. The evaluated gradient can be transformed into a positive valued vector of length four whose elements are the positive and negative components of the two gradients. The vector can be considered a quantization of orientation in the four directions:

$$\{|\nabla_p|-\nabla_p, |\nabla_p|'\nabla_p, |\nabla_n|-\nabla_n, \nabla_n|+\nabla_n\}$$

Operation 660 can generate an image-pixel descriptor for steerable filter. Steerable filters can be applied at each sampled position along a vector segment, such as a road. The steerable filter can be applied along the primary and normal direction. A magnitude response from quadrature pairs using the two orientations on the image plane can provide two values. A vector of length eight can be computed directly from the rectified quadrature pair responses. The steerable filters can be based on a second-derivative. The determined descriptors can be normalized to unit length after projection onto the descriptor subspace. The pixel regions used in computing the descriptors can be, for example patches of 24×24 pixels, or any other size or geometry. The pixel regions can be sampled, for example at every twelve pixel distance, or any other distance along the projected road segments, or along any other basis.

Operation 670 can generate an image-pixel descriptor for eigenvalues of a Hessian matrix. A Hessian matrix can comprise the second partial derivatives of pixel intensities in the region. The Hessian matrix can be a real-valued, symmetric two-by-two matrix. The two eigenvalues may be used for the classification vector. Two small eigenvalues can indicate approximately uniform intensity profile within the region. Two large eigenvalues can indicate corners, salt-and-pepper textures, or other non-directional texture. One large and one small eigenvalue can indicate a unidirectional texture pattern.

Operation 680 can generate an image-pixel descriptor for difference of Gaussians (DoG). The smoothed pixel patch can be convolved with two additional Gaussians. The first Gaussian can be defined by $\sigma_{s1}=1.6\sigma_s$, where $\sigma_s$ is the standard deviation of the smoothing Gaussian used in operation 620. The second Gaussian can be defined by $\sigma_{s2}=1.6\sigma_{s1}$. The pre-smoothed region, or resolution $\sigma_s$, can be used as the first DoG center and the wider Gaussian of resolution $\sigma_{s1}$ can be used as the second DoG center. The difference between $\sigma_{s1}$ and $\sigma_s$, and the difference between $\sigma_{s2}$ and $\sigma_{s1}$ can provide two linear DoG filter responses. The positive and negative rectified components of the two responses can provide a four-dimensional image pixel descriptor.

The various calculated descriptors 605 can be used alone, all together, or in any combinations as descriptor vectors in the training and classification techniques discussed herein. It should be appreciated that the descriptor discussed above are merely examples and various other descriptors may be used alone, or in combination with these. Other descriptors may identify textures, corners, intersections, and so forth. It should also be appreciated that while roadways are used as examples herein, other structures may also be identified, verified, or corrected using these techniques. As examples, pedestrian crossing, parking lots, squares, railroads, waterways, foliage tracts, land lot lines, and other structures or geographical features may be the subject of the techniques discussed herein.

In operation 690, the specified descriptors 605 are combined as desired to construct the relevant image-pixel descriptor for the local image region 140. After operation 690, the process 600 can loop back to operation 610 to identify the next local image region 140 to be analyzed.

Figure 7:
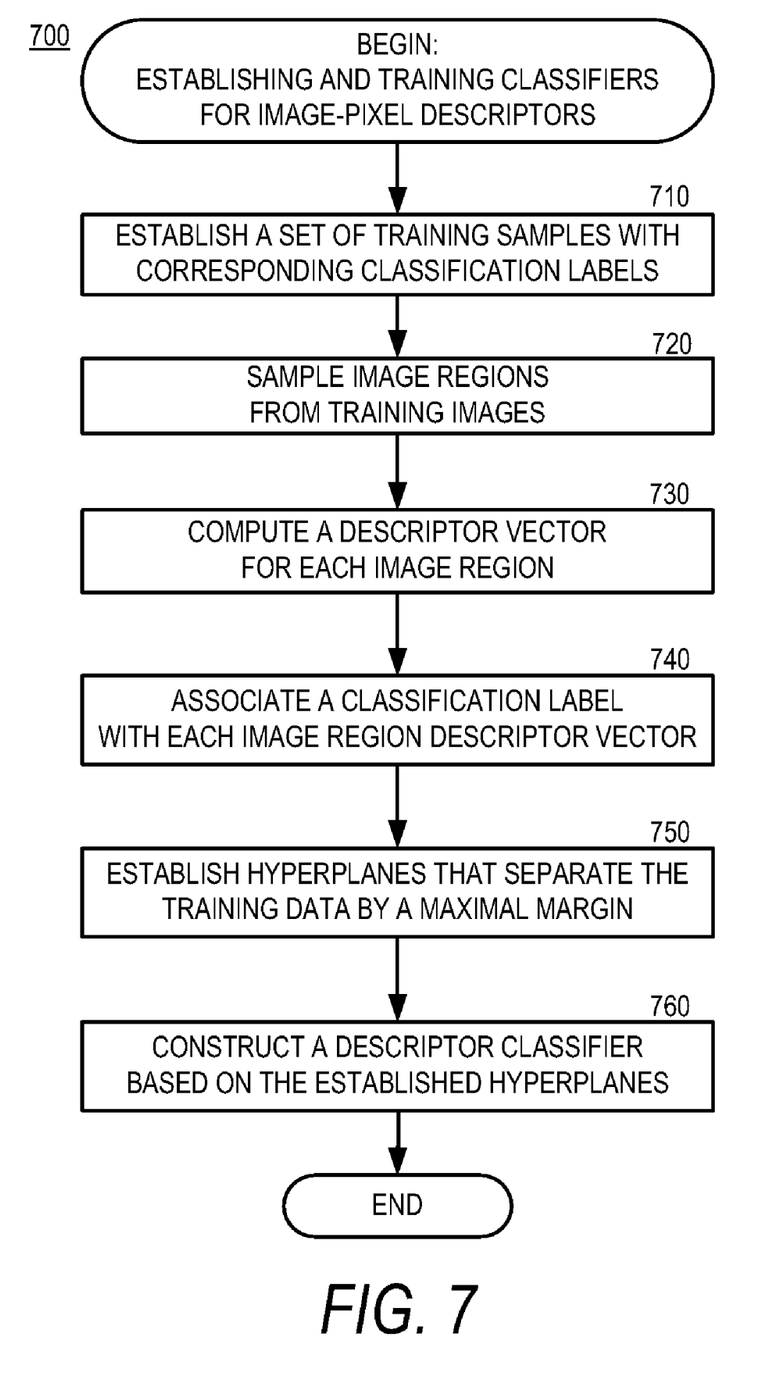
FIG. 7 is a flow diagram illustrating a process for establishing and training classifiers for image-pixel descriptors according to aspects of an embodiment presented herein.

Referring now to FIG. 7, additional details will be provided regarding the embodiments presented herein for validating and correcting map data using oblique images. In particular, FIG. 7 is a flow diagram illustrating aspects of a process 700 for establishing and training classifiers for image-pixel descriptors according to aspects of an embodiment presented herein. A descriptor vector associated with an image region 140 can be classified according to a binary classifier. For example, an image region 140 of a road segment may be classified into one of two classes: visible or occluded. Two values, such as +1 and −1, may be assigned to the classes. These binary classification labels may be associated with training data images or known examples used to train the classifier. The classifier parameters can be established, or trained, to define hyperplanes that separate differently classified training data by a maximal margin. Put simply, the hyperplanes can be established to in an attempt to best separate +1 class examples from −1 class examples. When such a classifier is applied to unclassified image data, a position of the descriptor vector relative to the hyperplane can estimate a classification as +1 or −1 for the new, unclassified image data. Training instances that lie closest to the hyperplane may be referred to as support vectors.

The process 700 begins at operation 710, where the known training images and classification labels are provided. At operation 720, image regions 140 are sampled from the training images.

At operation 730, descriptor vectors are established for the image regions 140 that were sampled in operation 720. Descriptor vectors can be computed as discussed with respect to process 600. These training descriptors can establish a set of N linearly-separable training samples of descriptors $d_i$ (for i=1 ... N). Each descriptor $d_i$ can have a dimension, or length, of m. When the data is not linearly-separable, a kernel can be used to map the data into a higher dimension as discussed in further detail below.

At operation 740, a classification label can be associated with each image region 140 descriptor vector $d_i$. These labels can be designated as $c_i$ (for i=1 ... N). For binary classification, each classifier label $c_i$ can be an element of the binary set defined as $\{-1, +1\}$.

At operation 750, hyperplanes can be established that separate the training data. Parameters of the hyperplanes can be determined such that the hyperplanes separate the training data by maximal margins. According to one embodiment, a class of separating hyperplanes can be of the general form:

$$<w,d>+b=0.$$

where <w, d> is the dot product between a weight vector w and a descriptor vector d. A threshold, or bias, value b can be a real scalar value.

Rescaling w and b such that the point closest to the hyperplane satisfies |<w, d>+b|=1, can provide a canonical form (w, b) of the hyperplane that satisfies:

$$c_i(<w,d_i>+b) \geq 1 \text{ for } i=1 \ldots N.$$

From this, the closest point to the hyperplane can be given as $1/\|w\|$. An optimal hyperplane can maximize this distance, or minimize:

$$\varphi(w) = \frac{1}{2}\|w\|^2 \text{ subject to } c_i\ (<w, d_i>+b) \geq 1 \text{ for } i = 1 \ldots N.$$

The objective function φ(w) can be minimized using Lagrange multipliers:

$$\lambda_i \geq 0 \text{ for all } i = 1 \ldots N, \text{ and}$$

$$\text{Lagrangian } L(w, b, \lambda) = \frac{1}{2}\|w\|^2 - \sum_{i=1}^{N} \lambda_i [c_i(\langle w, d_i \rangle + b) - 1].$$

The Lagrangian L can be minimized with respect to primal variables w and b, and maximized with respect to the Lagrange multipliers $\lambda_i$. The derivatives of L with respect to the primal variables vanish and therefore, $$\sum_{i=1}^{N} \lambda_i c_i = 0 \text{ and } w = \sum_{i=1}^{N} \lambda_i c_i d_i = 0.$$

The solution vector can be a subset of the training patterns including those descriptor vectors with non-zero $\lambda_i$. These can be referred to as support vectors. All the other training samples ($d_i$, $c_i$) can be considered irrelevant and their constraints not considered. Such samples, provide zero-valued termed when calculating:

$$w = \sum_{i=1}^{N} \lambda_i c_i d_i = 0.$$

The desired hyperplane can be completely determined by the descriptor vectors closest to it. Thus, the hyperplane need not depend on the other training vectors. Eliminating the primal variables w and b from the Lagrangian can provide an updated optimization problem to minimize:

$$W(\lambda) = \sum_{i=1}^{N} \lambda_i - \frac{1}{2} \sum_{i,j=1}^{N} \lambda_i \lambda_j c_i c_j \langle d, d_i \rangle$$

subject to $\lambda_i \geq 0$ for all $i = 1 \ldots N$ and $$\sum_{i=1}^{N} \lambda_i c_i = 0.$$

Once the Lagrange multipliers $\lambda_i$ for all i=1 . . . N are determined, the bias term b can be calculated. A set S of support vectors of size s is constructed from descriptor vectors $d_i$ with $0 < \lambda_i < 1$. This set of support vectors can have an equal number of descriptor vectors for $c_j = -1$ as descriptor vectors for $c_j = +1$. The bias term can be given as:

$$b = -\frac{1}{s} \sum_{d \in S} \sum_{j=1}^{N} \lambda_j c_j \langle d, d_j \rangle.$$

At operation 760, a descriptor classifier can be established based on the separating hyperplanes established in operation 750. The classifier can be expressed, in terms of a descriptor vector d, as:

$$f(d) = \text{sgn}\left(\sum_{i=1}^{N} \lambda_i c_i \langle d, d_i \rangle + b\right).$$

The process 700 can terminate after operation 760.

If a given set of input data is not linearly separable, the input data can be mapped into a higher dimensional space using a mapping function or kernel. The hyperplane can then be computed in the higher dimensional space. The kernel k can be evaluated on the descriptors d and $d_i$ as k(d, $d_i$)=<d, $d_i$>. Examples of kernels that may be used include those listed here. In these examples, m is the length of the descriptor vector and p the degree of the polynomial kernel.

Linear kernel: $k(d, d_i) = \sum_{k=1}^{m} d_k d_{ik}$.

Sigmoid kernel: $k(d, d_i) = \tanh\left(a \sum_{k=1}^{m} d_k d_{ik} + b\right)$.

Homogenous Polynomial kernel: $k(d, d_i) = \left(\sum_{k=1}^{m} d_k d_{ik}\right)^p$.

Gaussian Radial Basis kernel: $k(d, d_i) = \frac{1}{m}\left(\sum_{k=1}^{m} e^{-\frac{(d_k - d_{ik})^2}{2\sigma^2}}\right)$.

Exponential Radial Basis kernel: $k(d, d_i) = \frac{1}{m}\left(\sum_{k=1}^{m} e^{-\frac{|d_k - d_{ik}|}{2\sigma^2}}\right)$.

According to one embodiment, the Gaussian Radial Basis kernel may be used to improve performance in classifying visibility of roadways. The parameter σ can be set to a value of 0.8, for example. Other values for σ may also be used.

It should be appreciated that the process for establishing and training the classifier can be operated in a continuously adaptive fashion. For example, as classifications are made, the actual image data can be feed into the training vectors to train the classifier towards actual production data encountered in operating the system. Other pre-training or adaptive training techniques can also be used in establishing the classifiers discussed herein.

Figure 8:
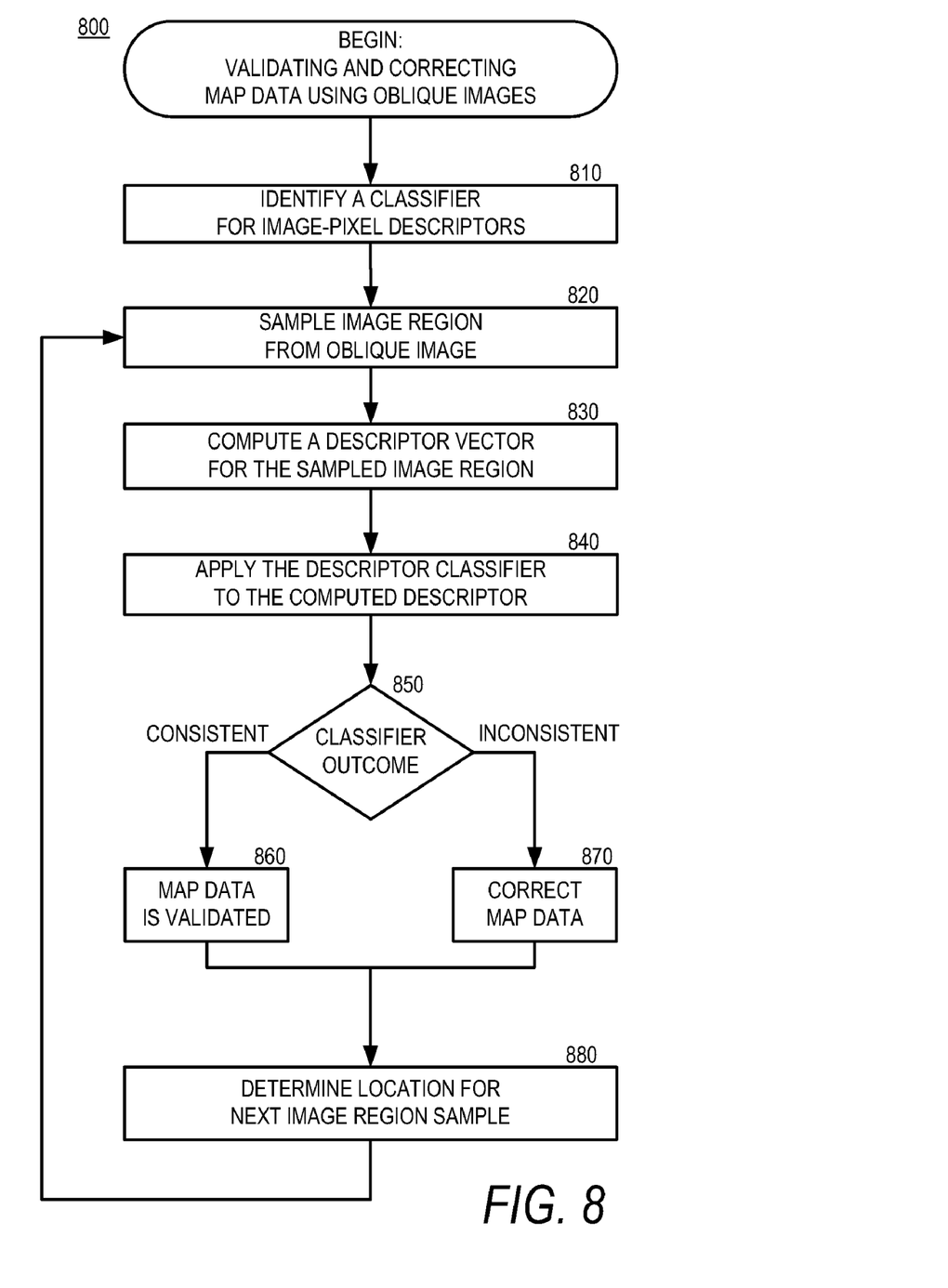
FIG. 8 is a flow diagram illustrating a process for validating and correcting map data using oblique images according to aspects of an embodiment presented herein.

Referring now to FIG. 8, a flow diagram illustrates aspects of a process 800 for validating and correcting map data using oblique images according to aspects of an embodiment presented herein. The process 800 begins at operation 810, where a classifier for image-pixel descriptors can be identified. For example, the classifier established and trained by process 700 may be used.

At operation, an image region 140 can be sampled from an oblique image 110. For example, the oblique image 110 may be sampled along a roadway at location j. At operation 830, a descriptor vector can be computed for the image region 140 that was sampled in operation 820. The descriptor vector can be computed as discussed with respect to process 600. The vector may be represented as an m-dimensional descriptor vector $d_j$ at the sampled location j.

At operation 840, the classifier identified in operation 810 may be applied to the descriptor vector $d_j$ computed in operation 830. The classifier output $f(d_j)$ can take on the binary classifier values of +1, or −1.

At operation 850, it can be determined if the classifier outcome is consistent (generally assigned to classifier label +1) or inconsistent (generally assigned to classifier label −1). If it is determined that the classifier outcome is consistent, the process 800 can continue to operation 860 where it is established that the sample image region 140 is locally consistent with its neighbors. As such, data alignment can be validated as correct for point j.

If instead, it is determined that the classifier outcome is inconsistent, the process 800 can continue to operation 870 where it is established that the sample image region 140 is not consistent in terms of the learned statistics and the observed data. At operation 870, the detected image inconsistency may be caused by incorrect vector data, missing or out-of-date structural model data, incorrect elevation data, incorrect z-ordering, or other issues in the data used to generate map images. This detection can be used to trigger a correction in the data. For example, if it is found that points in the neighborhood of j are consistent, that is $f(d_j)=+1$, vector data from those points can be connected using continuous curves, cubic B-splines, or other interpolating techniques to overcome the inconsistency at j.

After either operation 860 or 870, the process 800 can continue to operation 880. At operation 880, the location for the next image region 140 sample can be determined. That is, the next value for j can be established. After operation 880, the process 800 can loop back to operation 820 where the nest image region 140 can be sampled.

Figure 9:
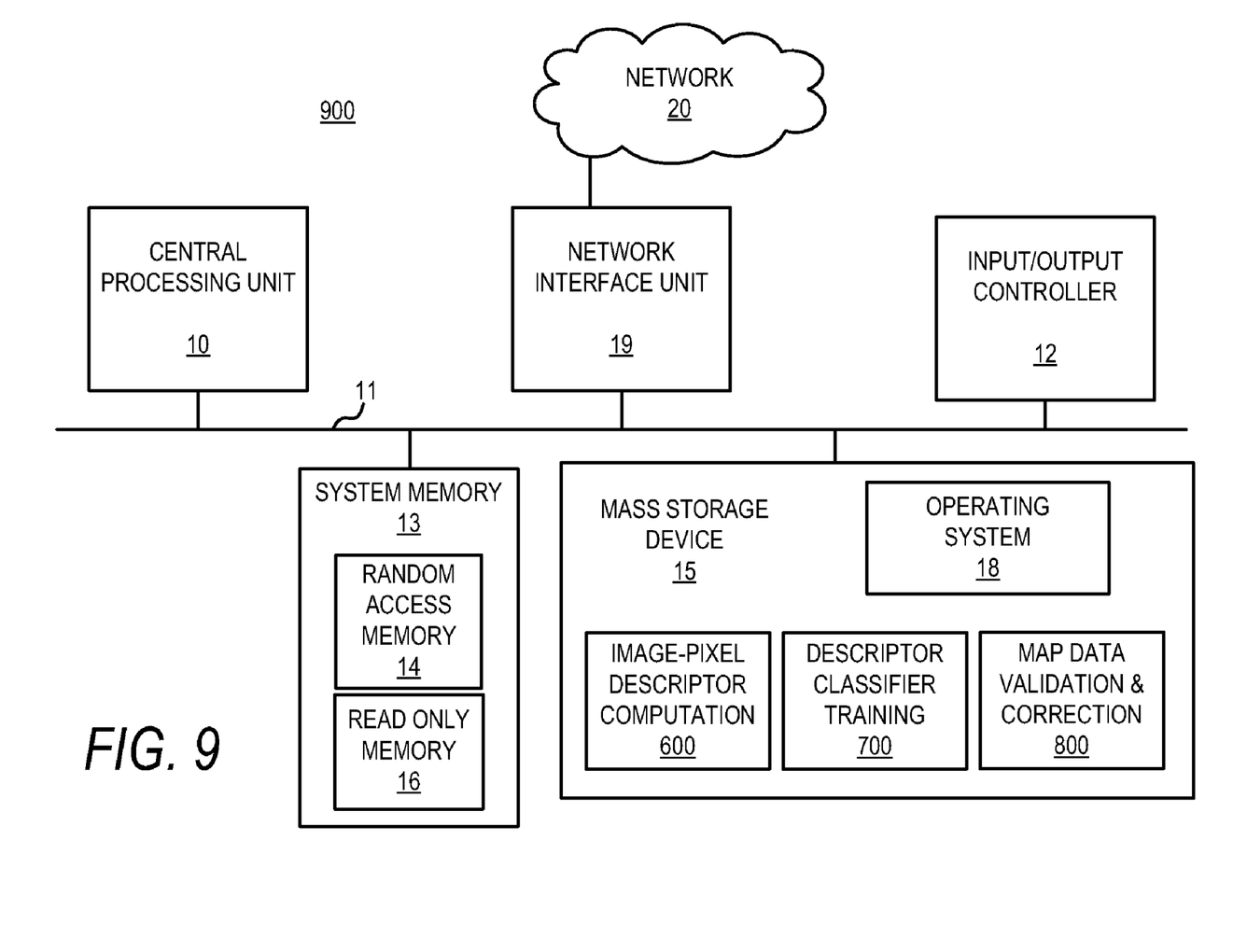
FIG. 9 is a computer architecture diagram showing an illustrative computer hardware and software architecture for a computing system capable of implementing aspects of an embodiment presented herein.

Turning now to FIG. 9, an illustrative computer architecture 900 can execute software components described herein for validating and correcting map data using oblique images. The computer architecture shown in FIG. 9 illustrates a conventional desktop, laptop, or server computer and may be utilized to execute any aspects of the software components presented herein. It should be appreciated however, that the described software components can also be executed on other example computing environments, such as mobile devices, television, set-top boxes, kiosks, vehicular information systems, mobile telephones, embedded systems, or otherwise.

The computer architecture illustrated in FIG. 9 can include a central processing unit 10 (CPU), a system memory 13, including a random access memory 14 (RAM) and a read-only memory 16 (ROM), and a system bus 11 that can couple the system memory 13 to the CPU 10. A basic input/output system containing the basic routines that help to transfer information between elements within the computer 900, such as during startup, can be stored in the ROM 16. The computer 900 may further include a mass storage device 15 for storing an operating system 18, software, data, and various program modules, such as those associated with image-pixel descriptor computation 600, descriptor classifier training 700, and map data validation and correction 800. Program modules for image-pixel descriptor computation 600, descriptor classifier training 700, and map data validation and correction 800 can execute portions of software components described herein.

The mass storage device 15 can be connected to the CPU 10 through a mass storage controller (not illustrated) connected to the bus 11. The mass storage device 15 and its associated computer-readable media can provide non-volatile storage for the computer 900. Although the description of computer-readable media contained herein refers to a mass storage device, such as a hard disk or CD-ROM drive, it should be appreciated by those skilled in the art that computer-readable media can be any available computer storage media that can be accessed by the computer 900.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 900.

According to various embodiments, the computer 900 may operate in a networked environment using logical connections to remote computers through a network such as the network 20. The computer 900 may connect to the network 20 through a network interface unit 19 connected to the bus 11. It should be appreciated that the network interface unit 19 may also be utilized to connect to other types of networks and remote computer systems. The computer 900 may also include an input/output controller 12 for receiving and processing input from a number of other devices, including a keyboard, mouse, or electronic stylus (not illustrated). Similarly, an input/output controller 12 may provide output to a video display, a printer, or other type of output device (also not illustrated).

As mentioned briefly above, a number of program modules and data files may be stored in the mass storage device 15 and RAM 14 of the computer 900, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the program modules for image-pixel descriptor computation 600, descriptor classifier training 700, and map data validation and correction 800 for execution by the CPU 10. The mass storage device 15, the ROM 16, and the RAM 14 may also store other types of program modules.

Based on the foregoing, it should be appreciated that technologies for validating and correcting map data using oblique images are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for validating a map using an oblique image, the method comprising:
   sampling an image region of the oblique image;
   computing a descriptor vector of the sampled image region;
   applying a classifier function to the descriptor; and
   classifying the sampled image region as consistent or inconsistent in response to applying the classifier.

2. The method of claim 1, further comprising correcting map data associated with the oblique image in response to classifying the sampled image region as inconsistent.

3. The method of claim 1, further comprising reducing uncertainty in map data associated with the oblique image in response to classifying the sampled image region.

4. The method of claim 1, wherein the descriptor vector comprises statistical moments of pixel colors within the image region.

5. The method of claim 1, wherein the descriptor vector comprises a normalized gradient of pixels within the image region.

6. The method of claim 1, wherein the descriptor vector comprises responses associated with a steerable filter.

7. The method of claim 1, further comprising constructing the classifier based on hyperplanes that separate training data by a maximal margin.

8. The method of claim 7, wherein training data comprises descriptor vectors associated with known image data.

9. The method of claim 1, wherein classifying the sampled image region comprises detecting an error in vector data associated with the map.

10. The method of claim 1, wherein classifying the sampled image region comprises detecting an error in elevation data associated with the map.

11. A computer storage medium having computer executable instructions for validating a map using an oblique image stored thereon which, when executed by a computer, cause the computer to:
sample an image region of the oblique image;
compute a descriptor vector of the sampled image region;
apply a classifier function to the descriptor; and
classify the sampled image region as consistent or inconsistent in response to applying the classifier.

12. The computer storage medium of claim 11, further causing the computer to correct map data associated with the oblique image in response to classifying the sampled image region as inconsistent.

13. The computer storage medium of claim 11, further causing the computer to reduce uncertainty in map data associated with the oblique image in response to classifying the sampled image region.

14. The computer storage medium of claim 11, wherein the descriptor vector comprises statistical moments of pixel colors within the image region.

15. The computer storage medium of claim 11, wherein the descriptor vector comprises a normalized gradient of pixels within the image region.

16. The computer storage medium of claim 11, wherein the descriptor vector comprises a response of a difference of Gaussian applied to pixels within the image region.

17. The computer storage medium of claim 11, further causing the computer to construct the classifier based on hyperplanes that separate training data by a maximal margin.

18. The computer storage medium of claim 11, wherein classifying the sampled image region comprises detecting an error in vector data associated with the oblique image.

19. The computer storage medium of claim 11, wherein classifying the sampled image region comprises detecting an error in elevation data associated with the oblique image.

20. A method for validating a map using an oblique image, the method comprising:
establishing training data comprising descriptor vectors associated with known image data;
establishing a classifier based on hyperplanes that separate the training data by a maximal margin;
sampling an image region of the oblique image;
computing a descriptor vector of the sampled image region of the oblique image;
applying a classifier function to the descriptor vector of the sampled image region;
classifying the sampled image region as consistent or inconsistent in response to applying the classifier; and
correcting map data associated with the oblique image in response to classifying the sampled image region as inconsistent.

* * * * *